(12) United States Patent
Han

(10) Patent No.: US 9,453,852 B2
(45) Date of Patent: Sep. 27, 2016

(54) AXLE ASSEMBLY MAKING WHEEL SPEED MEASURING PRECISELY

(71) Applicant: HYUNDAI MOBIS CO., LTD., Seoul (KR)

(72) Inventor: Min-Hee Han, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/792,320

(22) Filed: Jul. 6, 2015

(65) Prior Publication Data

US 2016/0054346 A1 Feb. 25, 2016

(30) Foreign Application Priority Data

Aug. 20, 2014 (KR) .................. 10-2014-0108276

(51) Int. Cl.
| | |
|---|---|
| *G01P 3/00* | (2006.01) |
| *G01P 3/487* | (2006.01) |
| *G01P 3/44* | (2006.01) |
| *B60B 35/16* | (2006.01) |
| *B60B 35/18* | (2006.01) |
| *G01D 5/12* | (2006.01) |
| *G01L 17/00* | (2006.01) |
| *F16C 41/00* | (2006.01) |

(52) U.S. Cl.
CPC .............. *G01P 3/00* (2013.01); *B60B 35/16* (2013.01); *B60B 35/18* (2013.01); *G01D 5/12* (2013.01); *G01L 17/00* (2013.01); *G01P 3/443* (2013.01); *G01P 3/487* (2013.01); *B60B 2380/90* (2013.01); *B60B 2900/325* (2013.01); *F16C 41/007* (2013.01)

(58) Field of Classification Search
CPC ..... G01P 3/00; B60B 35/16; B60B 2380/90; G01D 5/12
See application file for complete search history.

(56) References Cited

U.S. PATENT DOCUMENTS

| | | | | |
|---|---|---|---|---|
| 2003/0201766 | A1* | 10/2003 | Faetanini ................ | G01P 1/026 324/173 |
| 2011/0181102 | A1* | 7/2011 | Albertson ............. | F16C 19/186 301/109 |

FOREIGN PATENT DOCUMENTS

| | | | | |
|---|---|---|---|---|
| JP | 2005321375 A | * | 11/2005 | .............. G01P 3/487 |
| KR | 10-2007-0110641 A | | 11/2007 | |
| KR | 10-2009-0130600 A | | 12/2009 | |

* cited by examiner

*Primary Examiner* — Faye M Fleming

(74) *Attorney, Agent, or Firm* — NSIP Law

(57) ABSTRACT

An axle assembly for measuring wheel speed is provided. The axle assembly includes a knuckle having a locking jaw for a bearing formed at a position on a vehicle, the knuckle including an inner circumferential surface configured to allow the bearing to be inserted from the outside of the vehicle to the inside, a speed sensor affixed to the locking jaw, and a magnetic encoder affixed to the bearing.

7 Claims, 5 Drawing Sheets

AXLE ASSEMBLY MAKING WHEEL SPEED MEASURING PRECISELY

CROSS-REFERENCE TO RELATED APPLICATION(S)

This application claims the benefit under 35 USC 119(a) of Korean Patent Application No. 10-2014-0108276, filed on Aug. 20, 2014 in the Korean Intellectual Property Office, the entire disclosure of which is incorporated herein by reference for all purposes.

BACKGROUND

1. Field

The following description relates to an axle assembly which allows for a more precise measuring of wheel speed by providing a speed sensor on a locking jaw formed at an inner portion of a knuckle of a bearing and a magnetic encoder is provided to the bearing, whereby the speed sensor and the magnetic encoder are closely positioned with each other.

2. Description of Related Art

In general, a mounting structure of a first generation wheel bearing is to press-fit a bearing 1 into a knuckle 2 in an inner side of a vehicle as shown in FIGS. 1A and 1B.

The method of using a tone wheel 3 to measure a wheel rotation speed of a current vehicle has been widely used.

By sensing the movement of the tone wheel 3 mounted on a drive shaft via a wheel speed sensor 5, the wheel rotation speed of the vehicle can be calculated.

On the other hand, in a case that Indirect Tire Pressure Monitoring System (i-TPMS) is provided to a vehicle, using the magnetic encoder for measuring the wheel rotation speed instead of the tone wheel is the current trend.

In the case of using the magnetic encoder instead of using the tone wheel, how the speed sensor is close to the magnetic encoder is the key for accurate measurement.

In the first generation wheel bearing structure, however, there was difficulty in making the magnetic encoder sensor and the speed sensor to be closed with each other.

The case of measuring the wheel speed of a vehicle by using the magnetic encoder with magnetic properties and the speed sensor can measure more accurate and delicate signal than the case of measuring the wheel speed of a vehicle by using the tone wheel and the wheel speed sensor. However, it was difficult to make the speed sensor and the magnetic encoder to be closed with each other in the first generation wheel bearing assembly structure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an axle assembly for measuring wheel speed includes a knuckle having a locking jaw for a bearing formed at a position on a vehicle, the knuckle including an inner circumferential surface configured to allow the bearing to be inserted from the outside of the vehicle to the inside, a speed sensor affixed to the locking jaw and a magnetic encoder affixed to the bearing.

The axle assembly may include the locking jaw formed in an annular shape toward a center from the inner circumferential surface of the knuckle, and a mounting space in which the speed sensor can be positioned is formed at the locking jaw The axle assembly may include a mounting space formed by cutting toward the inner circumference circumferential surface of the knuckle from an inner circumferential surface of the locking jaw.

The axle assembly may be configured such that the height of the locking jaw is formed to be larger than the height of the speed sensor.

The axle assembly may be configured such that the magnetic encoder is formed in an annular shape capable of being attached to one side surface of the bearing and attached to the one surface in contact with the locking jaw among the two sides of the bearing.

The axle assembly may include a drive shaft engaged with the bearing and fixed to the vehicle a hub coupled with the drive shaft, and wheels engaged with the hub.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1A:
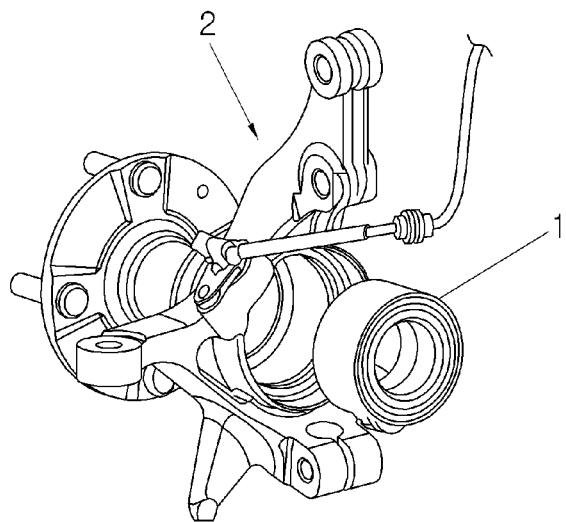
FIGS. 1A and 1B are perspective views of a wheel bearing according to the prior art.
Figure 1B:
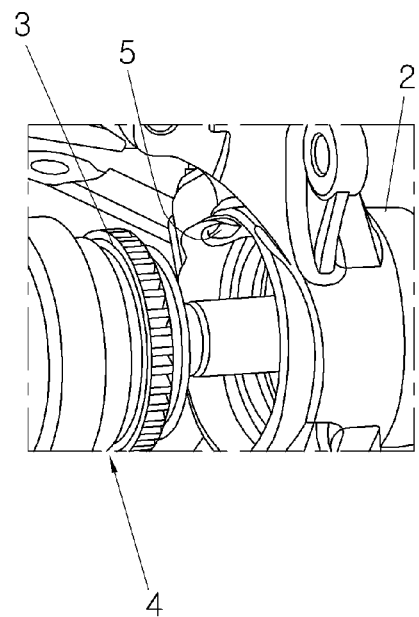
Figure 2A:
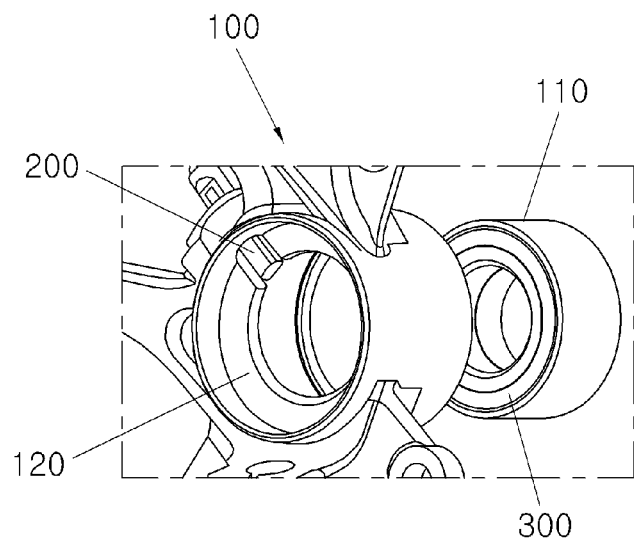
FIGS. 2A and 2B are a partial perspective view and a partial cross-sectional view illustrating an example of an axle assembly for precision wheel speed measurement.
Figure 2B:
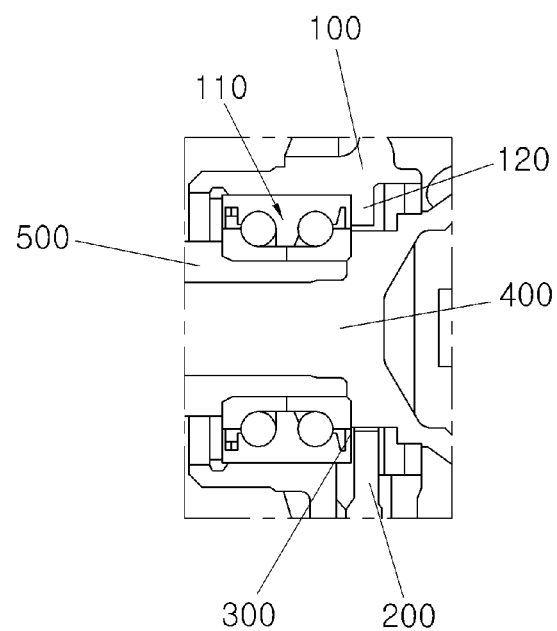
Figure 3:
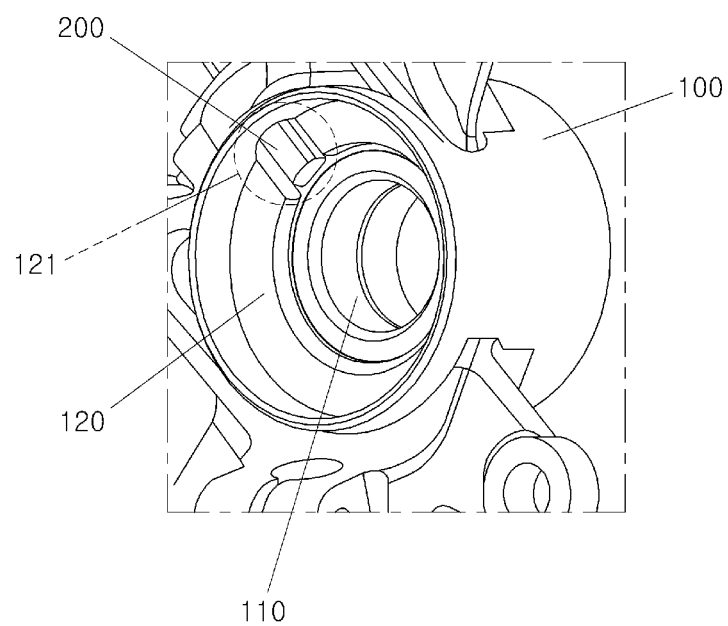
FIG. 3 is another partial perspective view illustrating an example of an axle assembly for precision wheel speed measurement.
Figure 4:
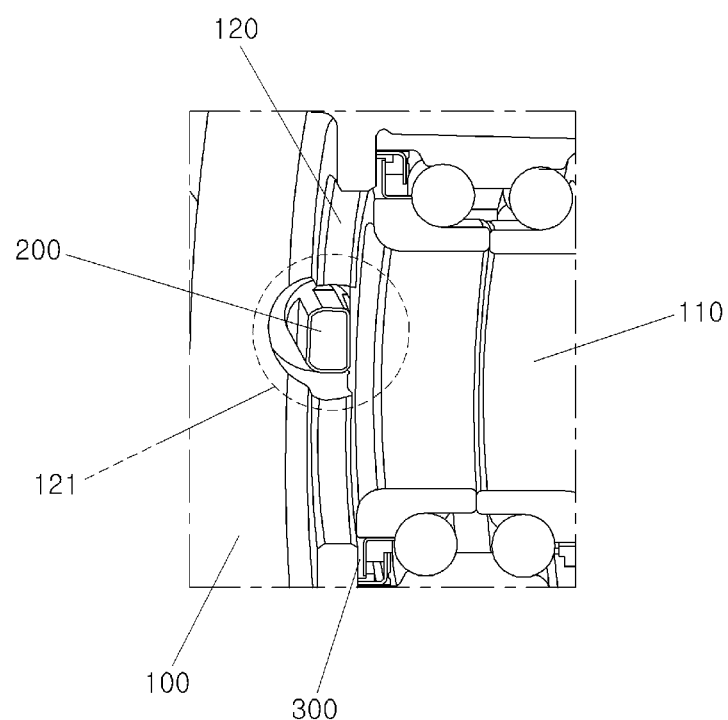
FIG. 4 is yet another partial perspective view illustrating an example of an axle assembly for precision wheel speed measurement.
Figure 5A:
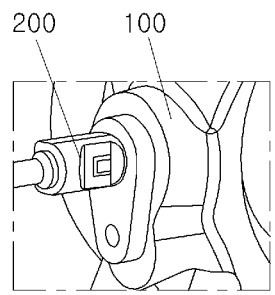
FIGS. 5A, 5B and 5C are partial perspective views illustrating an example of a magnetic encoder included in an axle assembly for precision wheel speed measurement.
Figure 5B:
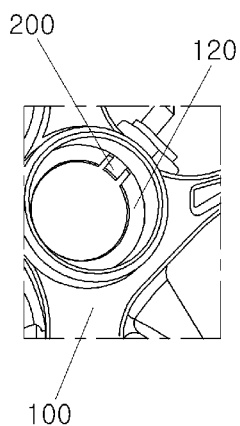
Figure 5C:
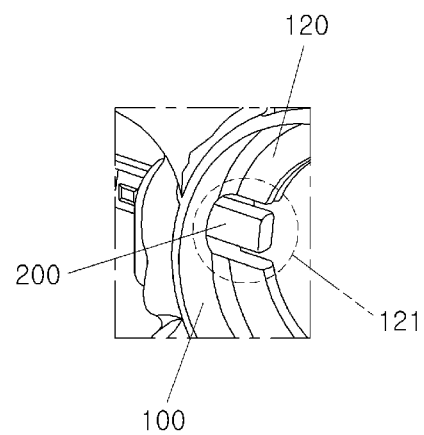
Figure 6:
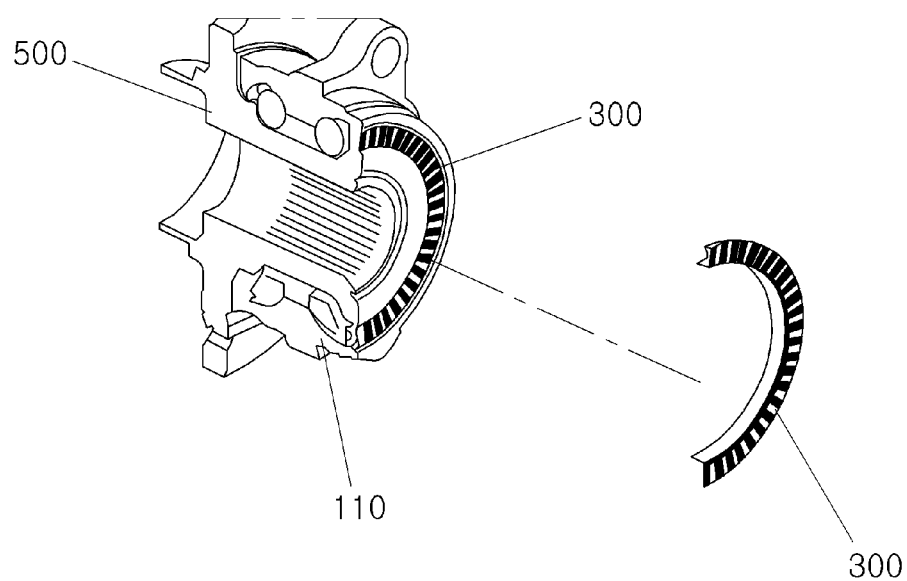
FIG. 6 is a cross-section view illustrating an example of a speed sensor included in an axle assembly for precision wheel speed.

As shown in FIGS. 2A to 6, an axle assembly for precision measuring of wheel speed according to embodiments of the present application may include a knuckle 100 having a locking jaw 120 for a bearing 110 formed at a position close to a moving part of the vehicle, the knuckle including an inner circumferential surface configured to allow the bearing 110 to be inserted from the outside of the vehicle to the inside; a speed sensor 200 provided to the locking jaw 120; and a magnetic encoder 300 provided to the bearing 110.

The locking jaw 120 may be formed in an annular shape toward the center from the inner circumference surface of the knuckle 100. A mounting space 121 in which the speed sensor 200 can be positioned may be formed at the locking jaw 120.

In an embodiment of the present application, the mounting space 121 may be formed by cutting toward the inner circumferential surface of the knuckle 100 from an inner circumferential surface of the locking jaw 120.

In an embodiment, in order to prevent the speed sensor 200 from being damaged by press-fitting of the bearing 110, the height of the locking jaw 120 may be formed larger than that of the speed sensor 200.

Further, the speed sensor 200 may be mounted at a through-hole opened toward the mounting space 121 through the knuckle 100.

The speed sensor 200 may be positioned close to the bearing 110, e.g., at a distance of up to 0.5 mm.

The magnetic encoder 300 may be formed in an annular shape capable of being attached to one side surface of the bearing 110 and attached to the one surface in contact with the locking jaw 120 among the two sides of the bearing 110.

Since the magnetic encoder 300 may be manufactured in order for N-pole and S-pole to be repeated, it may be possible to more accurately measure the wheel rotation speed of the vehicle as compared to a conventional tone wheel.

Since the magnetic encoder 300 and the speed sensor 200 may be sealed by the inner side surfaces of the bearing 110 and the knuckle 110, contaminants may be prevented from entering from the outside, whereby the speed sensor 200 is prevented from being contaminated.

The axle assembly for making precision wheel speed measurements according to an embodiment of the present application may further include a drive shaft 400 engaged with the bearing 110 and fixed to the vehicle; a hub 500 coupled with the drive shaft 400; and wheels engaged with the hub 500.

The magnetic encoder 300 is used in an Indirect Tire Pressure Monitoring System (i-TPMS), thereby reducing the cost for application to the vehicle more than the Tire Pressure Monitoring System (TPMS).

However, in order to apply the magnetic encoder 300 to a compact car, there may be a disadvantage in that the size of the bearing 110 must be raised in order to increase the sensing ability. This is because the magnetic force should be raised by increasing the area of the magnetic encoder 300 overlaid over the bearing 110.

Therefore, if the axle assembly is produced according to the present application in which the speed sensor 200 can be positioned closer to the magnetic encoder 300 provided to the bearing 110 compared to the conventional method, it is excepted the magnetic encoder 300 will be available in compact car without increasing the size of the bearing 110.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An axle assembly for measuring wheel speed, the axle assembly comprising:
    a knuckle comprising a locking jaw for a bearing formed at a position on a vehicle, the knuckle comprising an inner circumferential surface configured to allow the bearing to be inserted from the outside of the vehicle to the inside;
    a speed sensor affixed to the locking jaw; and
    a magnetic encoder affixed to the bearing,
    wherein:
    the locking jaw is formed in an annular shape toward a center from the inner circumferential surface of the knuckle,
    a mounting space in which the speed sensor can be positioned is formed at the locking jaw, and
    wherein the mounting space is formed by cutting toward the inner circumferential surface of the knuckle from an inner circumferential surface of the locking jaw.

2. The axle assembly of claim 1, wherein the height of the locking jaw is formed to be larger than the height of the speed sensor.

3. The axle assembly of claim 2, wherein the magnetic encoder and the speed sensor are sealed by inner side surfaces of the bearing and the knuckle.

4. The axle assembly of claim 1, wherein the magnetic encoder is formed in an annular shape capable of being attached to one side surface of the bearing and attached to the one surface in contact with the locking jaw among the two sides of the bearing.

5. The axle assembly of claim 1, further comprising:
    a drive shaft engaged with the bearing and fixed to the vehicle;
    a hub coupled with the drive shaft; and
    wheels engaged with the hub.

6. The axle assembly of claim 1, wherein the speed sensor is mounted at a through-hole extending toward the mounting space through the knuckle.

7. The axle assembly of claim 1, wherein the magnetic encoder comprises a repeating pattern of N-pole and S-pole.

* * * * *